(12) United States Patent
Liang

(10) Patent No.: US 8,243,471 B2
(45) Date of Patent: Aug. 14, 2012

(54) DISPLAY DEVICE HAVING FOLDABLE PLATES

(75) Inventor: An-Gang Liang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 203 days.

(21) Appl. No.: 12/788,293

(22) Filed: May 26, 2010

(65) Prior Publication Data
US 2011/0157860 A1    Jun. 30, 2011

(30) Foreign Application Priority Data
Dec. 31, 2009 (CN) .......................... 2009 1 0312980

(51) Int. Cl.
*H02B 1/01* (2006.01)

(52) U.S. Cl. .......................... 361/829; 361/810; 361/807

(58) Field of Classification Search .................. 361/829, 361/807, 810, 679.15, 279.22, 679.04, 679.55, 361/679.27, 681, 728–730; 439/31; 345/1.1; 381/300, 303–307, 333, 341, 345, 386, 388
See application file for complete search history.

(56) References Cited

U.S. PATENT DOCUMENTS

| | | | | |
|---|---|---|---|---|
| 2,607,143 | A * | 8/1952 | Wagner | 40/576 |
| 5,265,357 | A * | 11/1993 | Yu | 40/714 |
| 6,031,714 | A * | 2/2000 | Ma | 361/679.22 |
| 6,151,401 | A * | 11/2000 | Annaratone | 381/388 |
| 6,295,038 | B1 * | 9/2001 | Rebeske | 345/1.1 |
| 6,351,372 | B1 * | 2/2002 | Kim | 361/679.15 |
| 6,532,146 | B1 * | 3/2003 | Duquette | 361/679.04 |
| 6,667,878 | B2 * | 12/2003 | Ponx | 361/679.04 |
| 6,794,798 | B2 * | 9/2004 | Watanabe et al. | 310/334 |
| 7,016,184 | B1 * | 3/2006 | Oneyama et al. | 361/679.27 |
| 7,136,282 | B1 * | 11/2006 | Rebeske | 361/679.55 |
| 2005/0270730 | A1 * | 12/2005 | Klushin et al. | 361/681 |

* cited by examiner

*Primary Examiner* — Hung S Bui
(74) *Attorney, Agent, or Firm* — Altis Law Group, Inc.

(57) ABSTRACT

A display device includes a display screen, a securing frame, and two foldable plates. The securing frame is mounted around the display screen. The two foldable plates are hinged to the securing frame, and arranged at opposite sides of the display screen, respectively. The two foldable plates are made of opaque material, and are respectively rotatable about two parallel rotating axes which are at the opposite sides of the display screen.

16 Claims, 5 Drawing Sheets

DISPLAY DEVICE HAVING FOLDABLE PLATES

BACKGROUND

1. Technical Field

The present disclosure relates to display devices, and more particularly to a display device having foldable plates.

2. Description of Related Art

Display devices are widely used in many offices. In many cases, display devices are open to the surrounding people in the office. When a user does a confidential transaction at their display device, they expect the contents on a screen of their display device to be private so other people who are surrounding them cannot see it. However, most display devices have wide view angles, thus the other people that are surrounding, can easily see the contents on the screen of the display device. This is very undesirable for the user.

Therefore, a display device is desired to overcome the above-mentioned shortcomings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Various embodiments will now be described in detail below with reference to the drawings.

Figure 1:
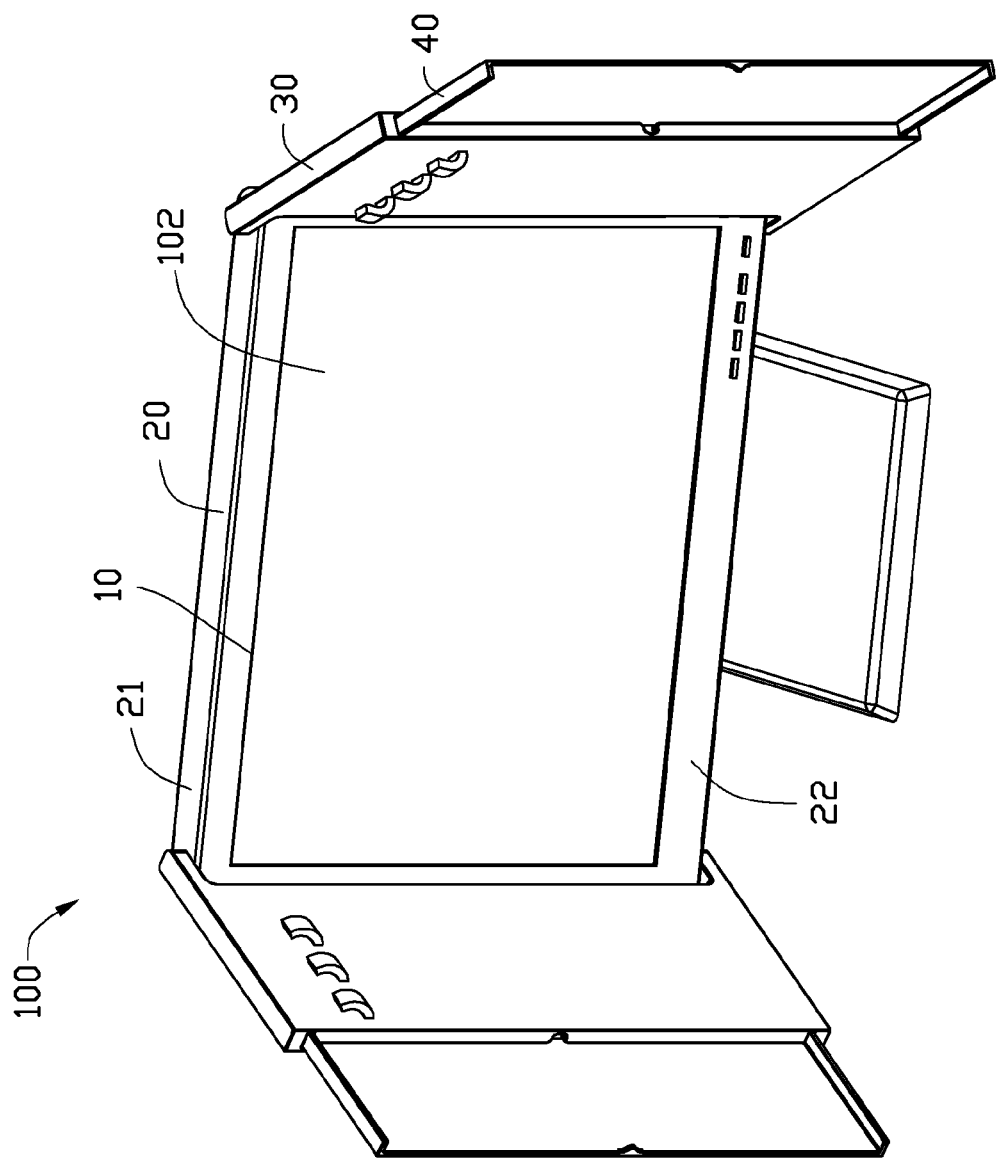
FIG. 1 is a schematic, isometric view of a display device in a first use state in accordance with an exemplary embodiment.
Figure 2:
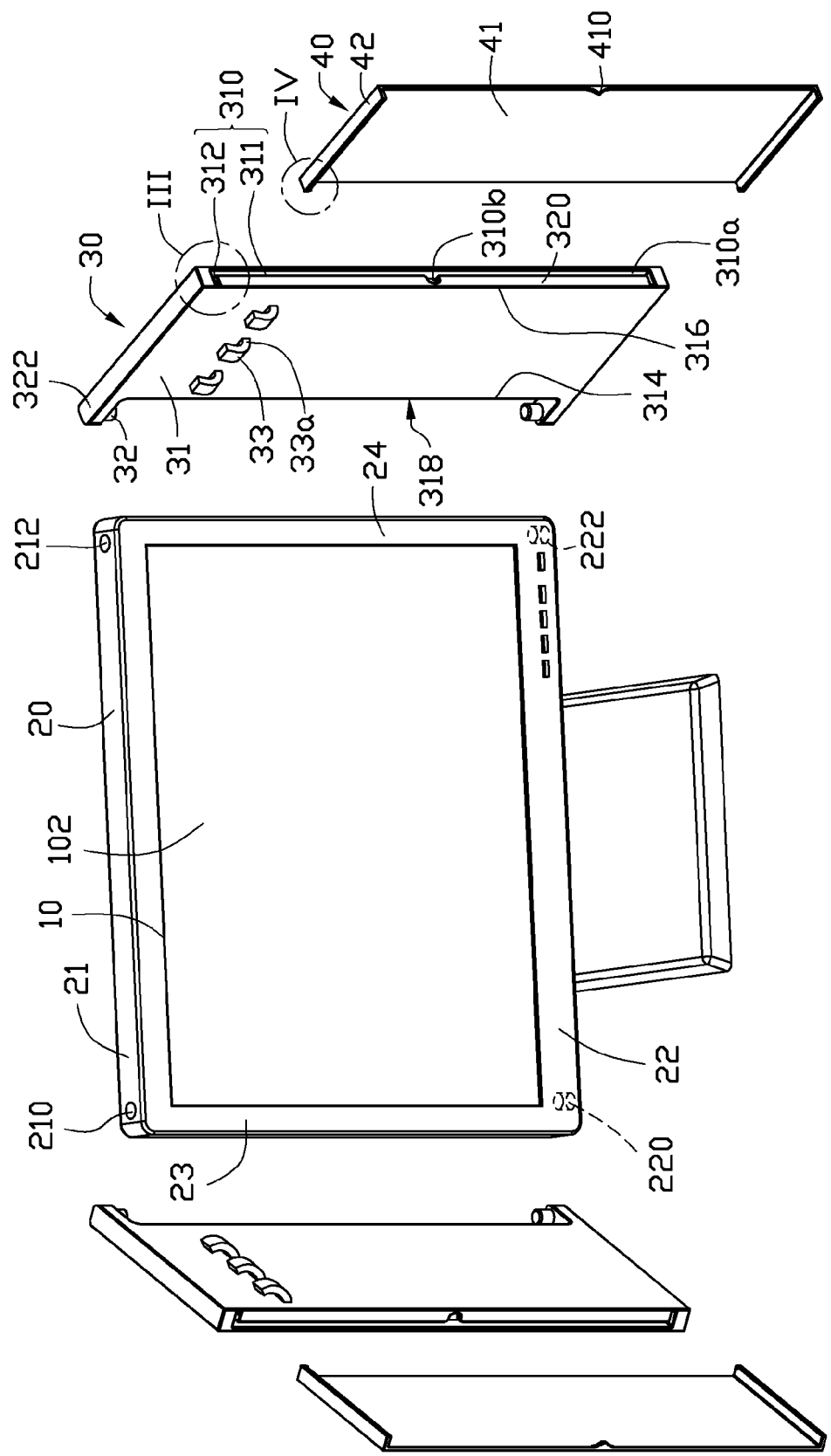
FIG. 2 is a partially disassembled isometric view of the display device in FIG. 1.

Referring to FIGS. 1 and 2, a display device 100 in accordance with an exemplary embodiment includes a display 10, a securing frame 20, two foldable plates 30, and two extending plates 40.

In this exemplary embodiment, the display 10 is a liquid crystal display and has a display screen 102 for displaying images, text or other contents. The display 10 can also be other types, such as a field emitting display or a cathode ray tube display. The securing frame 20 is mounted around the display 10. The securing frame 20 is rectangular and includes a top side 21, a bottom side 22 opposite to the top side 21, a left side 23 and a right side 24. The top side 21, the left side 23, the bottom side 22 and the right side 24 are connected end to end in the written order. The top side 21 extends along a top edge of the display 10, and the bottom side 22 extends along a bottom edge of the display 10. The top side 21 is substantially parallel to the bottom side 22.

The two foldable plates 30 are rotatably connected to the top side 21 and the bottom side 22 of the securing frame 20. Rotation axes of the two foldable plates 30 are substantially parallel to each other, are substantially perpendicular to the top side 21, and are adjacent to the left side 23 and the right side 24, respectively. Preferably, a length of each foldable plate 30 along the rotation axis thereof is larger than a length of each of the left and right sides 23 and 24. The top side 21 defines two first holes 210 and 212 in a top surface thereof. The first hole 210 is adjacent to the left side 23, and the first hole 212 is adjacent to the right side 24, respectively. The bottom side 22 defines two second holes 220 and 222 in a bottom surface thereof. The two second holes 220 and 222 are adjacent to the left side 23 and the right side 24, respectively. In this embodiment, the holes 210, 212, 220, and 222 are cylindrical blind holes. The first hole 210 is coaxial with the second hole 220, and the first hole 212 is coaxial with the second hole 222.

In this embodiment, the foldable plate 30 is substantially rectangular. The foldable plate 30 can be made of an opaque material. The opaque material can be black plastic material. Also, the opaque material can be frosted glass or frosted acrylic, which causes the foldable plate 30 have a good appearance.

Figure 3:
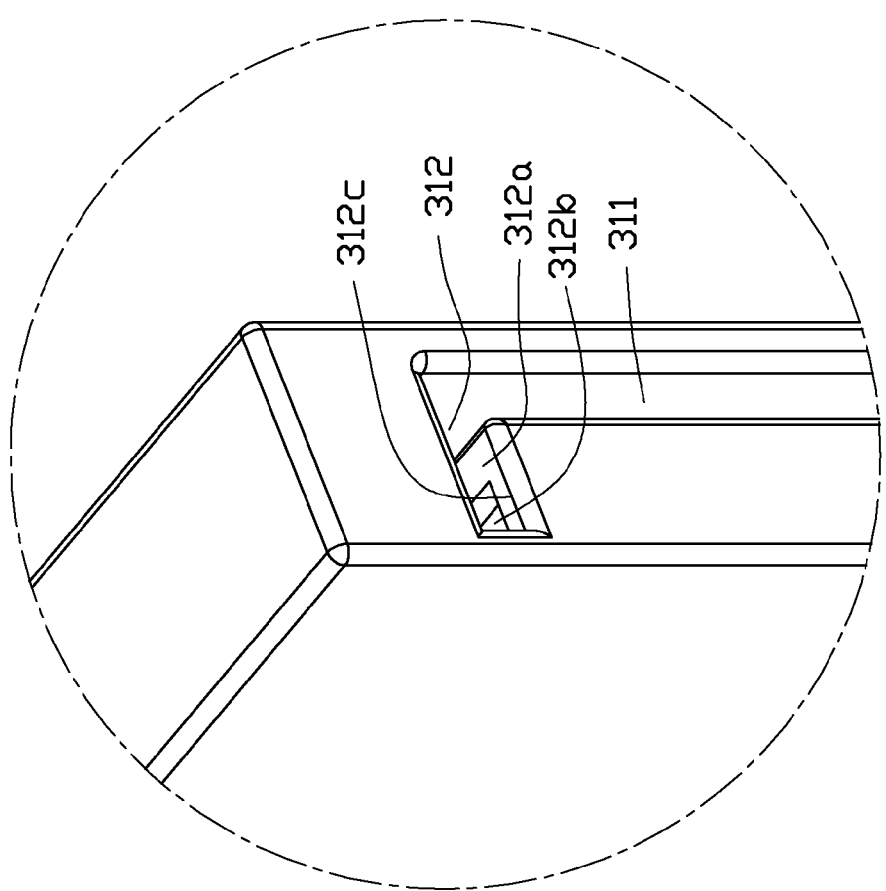
FIG. 3 is an enlarged sectional view in correspondence with the enlarged section III shown in FIG. 2 for showing a sliding slot.

Referring to FIGS. 2 and 3, each foldable plate 30 includes a rectangular main body 31, two rotation pins 32 and a plurality of hooks 33. The main body 31 is configured for isolating the display screen 102 of the display 10 from the left and right sides thereof such that the contents displayed on the display screen 102 can not be seen by the people at the left and right sides of the display screen 102. The main body 31 has two opposite sides 314 and 316 longer than the left side 23 and the right side 24 of the securing frame 20. The foldable plate 30 defines a receiving slot 310 in a side face 320 of the side 316. The receiving slot 310 extends along a direction from the side face 320 to a side face 318 of the side 314, and has an opening 310a at the side face 320. The receiving slot 310 includes a first slot portion 311 and two second slot portion 312. The first slot portion 311 at the opening 310a has two ends adjacent to two ends of the side 316, respectively. The two second slot portions 312 at the opening 310a extend perpendicularly from two ends of the first slot portion 311, respectively. Thus, the opening 310a generally has a "C" shape. The side face 320 further defines a cutout 310b therein. In this embodiment, the cutout 310b is at the middle portion of the side 316, and is in communication with the first slot portion 311. The main body 31 has an inner surface 312a in each second slot portion 312. The inner surface 312a is perpendicular to the side 316 and adjacent to the cutout 310b. A latching slot 312b is defined in the inner surface 312a. Thus, a resisting portion 312c is formed between the opening 310a and the latching slot 312b.

The foldable plate 30 further includes two support posts 322 protruding perpendicularly from the side face 318 of the side 314. The two rotation pins 32 extend perpendicularly from the support posts 322, respectively, and extend towards each other. The two support posts 322 are adjacent to two opposite ends of the side surface 318. In this embodiment, the two rotation pins 32 are cylindrical, and are coaxial with each other. Each of the two rotation pins 32 correspond to one of the first holes 210 and 212 and one of the second holes 220 and 222.

The plurality of hooks 33 is fixed on one surface of the main body 31. The hooks 33 are configured for placement of a writing implement or other office supplies. In this embodiment, each hook 33 is a curved bar with one end portion fixed on the main body 31. As shown in FIG. 2, the hooks 33 are arranged in a row for placement of a writing implement.

Figure 4:
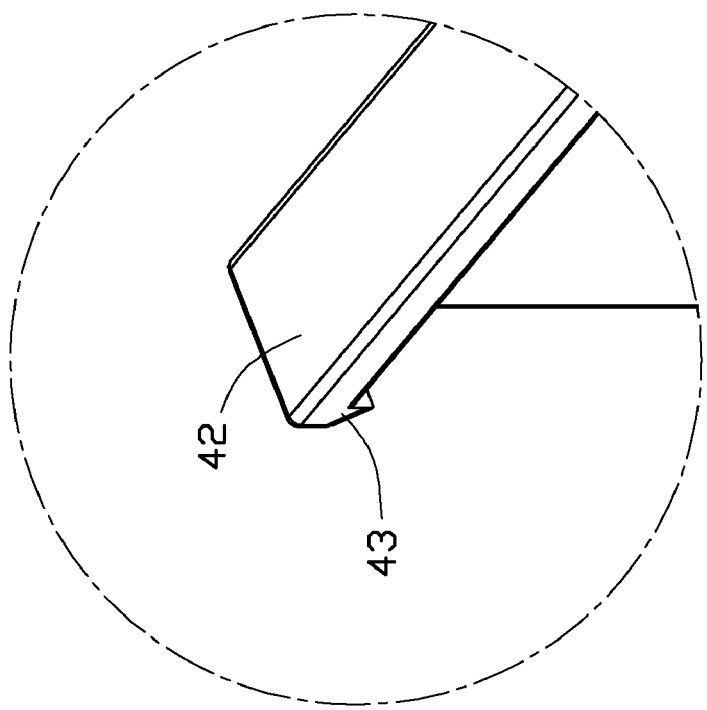
FIG. 4 is an enlarged sectional view in correspondence with the enlarged section IV shown in FIG. 2 for showing a latching protrusion.

Referring to FIGS. 2 and 4, the extending plate 40 has a similar shape to the foldable plate 30. In this embodiment, the extending plate 40 is made of an opaque material. The opaque material can be black plastic material, frosted glass or frosted acrylic. In this embodiment, the extending plate 40 has a same material as the foldable plate 30. The extending plate 40 has a shape corresponding to the receiving slot 310, such that the extending plate 40 can be engagingly received in the receiving slot 310. The extending plate 40 includes a main plate portion 41, and two flange portions 42 extending perpendicularly from two opposite sides of the main plate portion 41. Thus, the main plate portion 41 and the two flange portions 42 cooperatively form a "C" shape as seen from one side face of the extending plate 40. The main plate portion 41 is capable of being received in the first slot portion 311, and the two flange portions 42 are capable of being received in the two second slot portions 312, respectively. The extending plate 40 further includes a grip portion 410 extending from another side of the main plate portion 41, and two latching protrusions 43 formed at one distal end of each flange portions 42. The two latching protrusions 43 are adjacent to the remaining side of the main plate portion 41, which is opposite to the grip portion 410. The two latching protrusions 43 are configured for engaging with the two latching slots 312b formed in the inner surface of the main body 31, respectively, for preventing the extending plate 40 from separating from the foldable plate 30. The grip portion 410 conforms to the cutout 310b, and is received in the cutout 310b when the extending plate 40 is received in the main body 31. The grip portion 410 is convenient for the user to grip such that the extending plate 41 can be easily pulled out from the main body 31.

Referring also to FIG. 1, in use, the two rotation pins 32 of one foldable plate 30 are engaged in the first hole 210 and the second hole 220, and the two rotation pins of the other foldable plate 30 are engaged in the first hole 212 and the second hole 222. The rotation pins 32 are rotatable in the corresponding hole such that the two foldable plates 30 can rotate relative to the display 10. A rotation axis of each foldable plate 30 is the central axis of the rotation pins 32. Then one side of main plate portion 41 that the latching protrusions 43 are adjacent to is inserted in the sliding slot 310 from the opening 310a. The latching protrusions 43 are engaged in the latching slot 312b, respectively. Thus, the extending plate 40 is connected to the foldable plate 30. In this case, the main plate portion 41 is positioned out of the main body 31, and is adjacent to the side 316 of the main body 310. The extending plate 40 acts as an elongated plate of the main body 31, thus a larger area can be isolated from the display 10.

Figure 5:
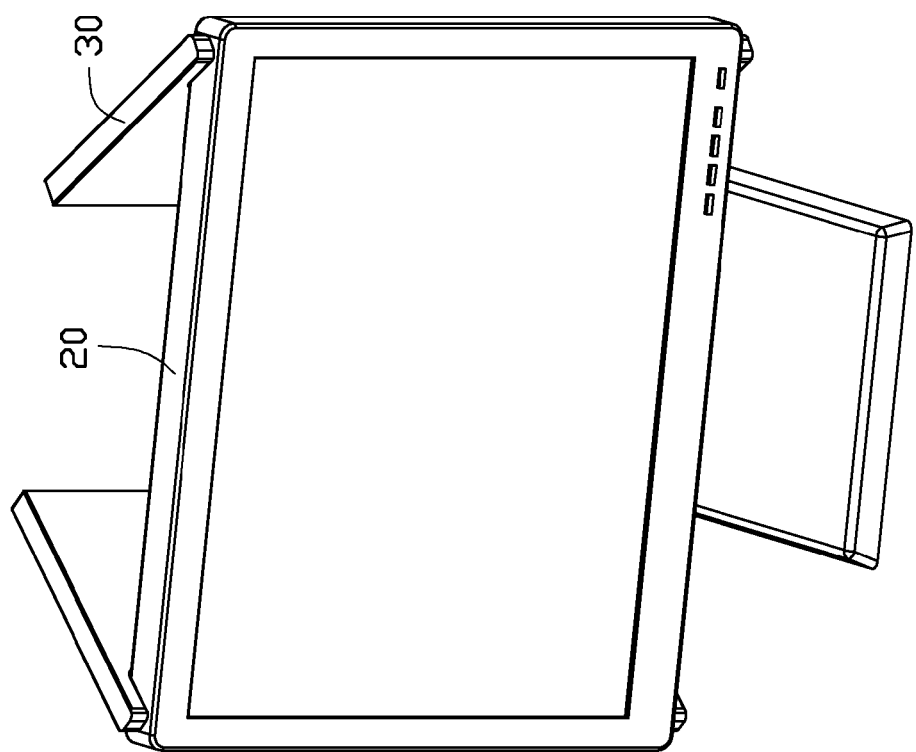
FIG. 5 a schematic, isometric view of the display device of FIG. 1 in a second use state in accordance with an exemplary embodiment.

Referring to FIG. 5, when the foldable plate 30 and the extending plate 40 are not in use, the extending plates 40 are pushed into the corresponding receiving slots 310, and then the foldable plates 30 are rotated to a backside of the display 10.

The foldable plate 30 can also be other shapes, as long as it can isolate the display 10 such that visibility of the display screen 102 of the display 10 is limited to a smaller viewing angle.

In this embodiment, the display 10 is isolated by the foldable plates 30 and the extending plates 40, thus preventing the display 10 from being seen by people located at the left and right sides of the display 10. This is convenient for the user who is doing confidential transaction or does not people around seeing the contents displayed on the display 10.

It is to be understood that the above-described embodiments are intended to illustrate rather than limit the disclosure. Variations may be made to the embodiments without departing from the spirit of the disclosure. The above-described embodiments illustrate the scope of the disclosure but do not restrict the scope of the disclosure.

The invention claimed is:

1. A display device, comprising:
a display screen;
a securing frame mounted around the display screen;
two foldable plates hinged to the securing frame and arranged at opposite sides of the display screen, respectively, the two foldable plates being made of opaque material and being respectively rotatable about two parallel rotating axes which are at the opposite sides of the display screen, each of the foldable plates defining a receiving slot having an inner surface and a latching slot in the inner surface; and
two extending plates being slidably received in the receiving slots, respectively, each of the extending plates comprising a latching protrusion configured for engaging in the latching slot.

2. The display device of claim 1, wherein the display screen is rectangular, the securing frame comprising a top side, a left side, a bottom side, and a right side connected end to end in the written order, the top side being parallel to the bottom side, and the left side being parallel to the right side, the foldable plates being parallel to the left side and the right side, and a length of the foldable plates along the rotating axes being larger than that of the left and right sides of the securing frame.

3. The display device of claim 2, wherein two first holes are defined in the top side of the securing frame, the first holes are respectively adjacent to the left side and the right side, two second holes are defined in the bottom side of the securing frame, aligned with the respective first holes, and the foldable plates each comprise a first rotation pin inserted in the corresponding first hole and a second rotation pin inserted in the corresponding second hole.

4. The display device of claim 1, wherein the opaque material is selected from the group consisting of black plastic material, frosted glass and frosted acrylic.

5. The display device of claim 1, wherein each of the foldable plates comprises a cutout in a side surface facing away from the corresponding rotating axis, and each of the extending plates further comprises a grip portion conforming to the corresponding cutout, the grip portions being received in the cutouts when the extending plates are received in the foldable plates.

6. The display device of claim 1, wherein the extending plates are made of an opaque material.

7. The display device of claim 6, wherein the opaque material is selected from the group consisting of black plastic material, frosted glass and frosted acrylic.

8. The display device of claim 1, further comprising a plurality of hooks fixed on a surface of each foldable plate.

9. The display device of claim 8, wherein the hooks are arranged in a row.

10. A display device, comprising:
a display screen;
a securing frame mounted around the display screen;
two foldable plates hinged to the securing frame and arranged at opposite sides of the display screen, respectively, the two foldable plates being made of opaque material and being respectively rotatable about two parallel rotating axes which are at the opposite sides of the display screen, each of the foldable plates comprising a receiving slot and a cutout in a side surface facing away from the corresponding rotating axis; and
two extending plates being respectively slidably received in the receiving slots, each of the extending plates comprising a grip portion conforming to the cutout, the grip portions being received in the cutouts when the extending plates are received in the foldable plates.

11. The display device of claim 10, wherein the display screen is rectangular, the securing frame comprising a top side, a left side, a bottom side, and a right side connected end to end in the written order, the top side being parallel to the bottom side, and the left side being parallel to the right side, the foldable plates being parallel to the left side and the right side, and a length of the foldable plates along the rotating axes being larger than that of the left and right sides of the securing frame.

12. The display device of claim 11, wherein two first holes are defined in the top side of the securing frame, the first holes being respectively adjacent to the left side and the right side, two second holes are defined in the bottom side of the securing frame, aligned with the respective first holes, and the foldable plates each comprise a first rotation pin inserted in the corresponding first hole and a second rotation pin inserted in the corresponding second hole.

13. The display device of claim 10, wherein the extending plates are made of an opaque material.

14. The display device of claim 13, wherein the opaque material is selected from the group consisting of black plastic material, frosted glass and frosted acrylic.

15. The display device of claim 10, further comprising a plurality of hooks fixed on a surface of each foldable plate.

16. The display device of claim 15, wherein the hooks are arranged in a row.

* * * * *